US012113601B2

(12) United States Patent
Chen et al.

(10) Patent No.: US 12,113,601 B2
(45) Date of Patent: Oct. 8, 2024

(54) TECHNIQUES FOR DIRECTIONAL SIGNAL STRENGTH INDICATION AND BEAM-SPECIFIC MEASUREMENT THRESHOLD

(71) Applicant: QUALCOMM Incorporated, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/063,218

(22) Filed: Dec. 8, 2022

(65) Prior Publication Data

US 2023/0108805 A1    Apr. 6, 2023

Related U.S. Application Data

(63) Continuation of application No. PCT/CN2022/071533, filed on Jan. 12, 2022.

(30) Foreign Application Priority Data

Jan. 14, 2021  (WO) ................ PCT/CN2021/071662

(51) Int. Cl.
*H04B 7/08*  (2006.01)
*H04B 7/06*  (2006.01)
(Continued)

(52) U.S. Cl.
CPC ......... *H04B 7/0857* (2013.01); *H04B 7/0632* (2013.01); *H04B 17/318* (2015.01); *H04W 24/08* (2013.01); *H04W 24/10* (2013.01)

(58) Field of Classification Search
CPC ... H04B 7/0857; H04B 7/0632; H04B 17/318
See application file for complete search history.

(56) References Cited

U.S. PATENT DOCUMENTS

2014/0146691 A1\* 5/2014 Soliman ................ H04W 24/10
                                                             370/252
2018/0220318 A1\* 8/2018 Uemura ............... H04B 17/318
(Continued)

FOREIGN PATENT DOCUMENTS

CN        111954221 A      11/2020
WO        2019209416       10/2019
(Continued)

OTHER PUBLICATIONS

International Search Report and Written Opinion—PCT/CN2021/071662—ISA/EPO—Oct. 18, 2021.
(Continued)

*Primary Examiner* — Jamal Javaid
*Assistant Examiner* — Ryan C Kavleski
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive configuration information for a received signal strength indication (RSSI) measurement, the configuration information indicating a transmission configuration indication (TCI) state configuration for the RSSI measurement. The UE may perform the RSSI measurement based at least in part on the TCI state configuration. The UE may transmit a measurement report of the RSSI measurement. Numerous other aspects are described.

30 Claims, 10 Drawing Sheets

(51) Int. Cl.
  *H04B 17/318* (2015.01)
  *H04W 24/08* (2009.01)
  *H04W 24/10* (2009.01)

(56) References Cited

U.S. PATENT DOCUMENTS

| | | | |
|---|---|---|---|
| 2019/0150133 A1 | 5/2019 | Li et al. | |
| 2019/0334603 A1 | 10/2019 | Venugopal et al. | |
| 2019/0394662 A1 | 12/2019 | Josan et al. | |
| 2020/0337058 A1* | 10/2020 | Song | H04L 5/0094 |
| 2020/0389884 A1 | 12/2020 | Hakola et al. | |
| 2021/0297170 A1* | 9/2021 | Niu | H04B 7/0632 |
| 2022/0086843 A1* | 3/2022 | Ying | H04W 72/541 |
| 2022/0124799 A1* | 4/2022 | Hu | H04L 5/0048 |
| 2022/0210818 A1* | 6/2022 | Cirik | H04W 72/12 |
| 2023/0412288 A1* | 12/2023 | Chen | H04W 24/10 |

FOREIGN PATENT DOCUMENTS

| | | |
|---|---|---|
| WO | 2020032618 A1 | 2/2020 |
| WO | 2020167837 A1 | 8/2020 |
| WO | 2022151125 A1 | 7/2022 |
| WO | 2022152148 A1 | 7/2022 |

OTHER PUBLICATIONS

International Search Report and Written Opinion—PCT/CN2022/071533—ISA/EPO—Apr. 13, 2022.

* cited by examiner

TECHNIQUES FOR DIRECTIONAL SIGNAL STRENGTH INDICATION AND BEAM-SPECIFIC MEASUREMENT THRESHOLD

CROSS-REFERENCE TO RELATED APPLICATIONS

This patent application is a continuation of PCT Patent Application No. PCT/CN2022/071533, filed on Jan. 12, 2022, entitled "TECHNIQUES FOR DIRECTIONAL SIGNAL STRENGTH INDICATION AND BEAM-SPECIFIC MEASUREMENT THRESHOLD," which claims priority to PCT Patent Application No. PCT/CN2021/071662, filed on Jan. 14, 2021, entitled "TECHNIQUES FOR DIRECTIONAL SIGNAL STRENGTH INDICATION AND BEAM-SPECIFIC MEASUREMENT THRESHOLD," and assigned to the assignee hereof. The disclosure of the prior applications is considered part of and are incorporated by reference into this patent application.

FIELD OF THE DISCLOSURE

Aspects of the present disclosure generally relate to wireless communication and to techniques and apparatuses for directional signal strength indication and a beam-specific measurement threshold.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving configuration information for a received signal strength indication (RSSI) measurement, the configuration information indicating a transmission configuration indication (TCI) state configuration for the RSSI measurement; performing the RSSI measurement based at least in part on the TCI state configuration; and transmitting a measurement report of the RSSI measurement.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the UE, and the measurement report indicates an RSSI beam group associated with the averaged value.

In some aspects, the measurement report includes an averaged value based at least in part on multiple RSSI measurements that are associated with a same receive beam of the UE and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

In some aspects, a method of wireless communication performed by a base station includes transmitting, to a UE, configuration information for an RSSI measurement, the configuration information indicating a TCI state configuration for the RSSI measurement; and receiving a measurement report of the RSSI measurement and the TCI state configuration.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the UE, and the measurement report indicates an RSSI beam group associated with the averaged value.

In some aspects, the measurement report includes an averaged value based at least in part on multiple RSSI measurements that are associated with a same receive beam of the UE and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

In some aspects, a UE for wireless communication includes a memory and one or more processors coupled to the memory, the one or more processors configured to: receive configuration information for an RSSI measurement, the configuration information indicating a TCI state configuration for the RSSI measurement; perform the RSSI measurement based at least in part on the TCI state configuration; and transmit a measurement report of the RSSI measurement.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the UE, and the measurement report indicates an RSSI beam group associated with the averaged value.

In some aspects, the measurement report includes an averaged value based at least in part on multiple RSSI measurements that are associated with a same receive beam of the UE and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

In some aspects, a base station for wireless communication includes a memory and one or more processors coupled to the memory, the one or more processors configured to:

transmit, to a UE, configuration information for an RSSI measurement, the configuration information indicating a TCI state configuration for the RSSI measurement; and receive a measurement report of the RSSI measurement and the TCI state configuration.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the UE, and the measurement report indicates an RSSI beam group associated with the averaged value.

In some aspects, the measurement report includes an averaged value based at least in part on multiple RSSI measurements that are associated with a same receive beam of the UE and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

In some aspects, a non-transitory computer-readable medium storing a set of instructions for wireless communication includes one or more instructions that, when executed by one or more processors of a UE, cause the UE to: receive configuration information for an RSSI measurement, the configuration information indicating a TCI state configuration for the RSSI measurement; perform the RSSI measurement based at least in part on the TCI state configuration; and transmit a measurement report of the RSSI measurement.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the UE, and the measurement report indicates an RSSI beam group associated with the averaged value.

In some aspects, the measurement report includes an averaged value based at least in part on multiple RSSI measurements that are associated with a same receive beam of the UE and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

In some aspects, a non-transitory computer-readable medium storing a set of instructions for wireless communication includes one or more instructions that, when executed by one or more processors of a base station, cause the base station to: transmit, to a UE, configuration information for an RSSI measurement, the configuration information indicating a TCI state configuration for the RSSI measurement; and receive a measurement report of the RSSI measurement and the TCI state configuration.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the UE, and the measurement report indicates an RSSI beam group associated with the averaged value.

In some aspects, the measurement report includes an averaged value based at least in part on multiple RSSI measurements that are associated with a same receive beam of the UE and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

In some aspects, an apparatus for wireless communication includes means for receiving configuration information for an RSSI measurement, the configuration information indicating a TCI state configuration for the RSSI measurement; means for performing the RSSI measurement based at least in part on the TCI state configuration; and means for transmitting a measurement report of the RSSI measurement.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the apparatus, and the measurement report indicates an RSSI beam group associated with the averaged value.

In some aspects, the measurement report includes an averaged value based at least in part on multiple RSSI measurements that are associated with a same receive beam of the apparatus and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

In some aspects, an apparatus for wireless communication includes means for transmitting, to a UE, configuration information for an RSSI measurement, the configuration information indicating a TCI state configuration for the RSSI measurement; and means for receiving a measurement report of the RSSI measurement and the TCI state configuration.

In some aspects, the measurement report includes an averaged value over a measurement duration based at least in part on the RSSI measurement being associated with a same TCI state for the measurement duration.

In some aspects, the measurement report includes an averaged value based at least in part on multiple RSSI measurements associated with a same receive beam of the UE, and the measurement report indicates an RSSI beam group associated with the averaged value.

In some aspects, the measurement report includes an averaged value based at least in part on multiple RSSI measurements that are associated with a same receive beam of the UE and are within a threshold value of each other, and the measurement report indicates an RSSI beam group associated with the averaged value.

In some aspects, the measurement report indicates a discrete measurement value.

In some aspects, the configuration information indicates, for each TCI state or TCI state group, at least one of: a measurement reporting threshold, an RSSI measurement timing configuration, or a measured RSSI result and a channel occupancy indicator.

In some aspects, for two or more TCI states or TCI state groups, the RSSI measurement timing configuration is associated with at least one of a same center frequency, a same reference subcarrier spacing, or a same cyclic prefix type.

In some aspects, the configuration information indicates a measurement duration of the RSSI measurement of at least 84 measurement symbols.

In some aspects, the configuration information indicates a reference subcarrier spacing of the RSSI measurement of at least 120 kilohertz.

In some aspects, the configuration information indicates a first TCI state and a second TCI state for the RSSI measurement, a set of RSSI measurement symbols for the first TCI state are consecutive with each other, and a set of RSSI measurement symbols for the second TCI state are consecutive with each other.

In some aspects, the first TCI state and the second TCI state are associated with different RSSI measurement timing configurations.

In some aspects, the configuration information indicates a first TCI state and a second TCI state for the RSSI measurement, and a set of RSSI measurement symbols for the first TCI state are non-consecutive with each other.

In some aspects, the first TCI state and the second TCI state are associated with a same RSSI measurement timing configuration and different subframe offsets, and the different subframe offsets are configured such that the set of RSSI measurement symbols for the first TCI state is non-overlapped with a set of measurement symbols for the second TCI state.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
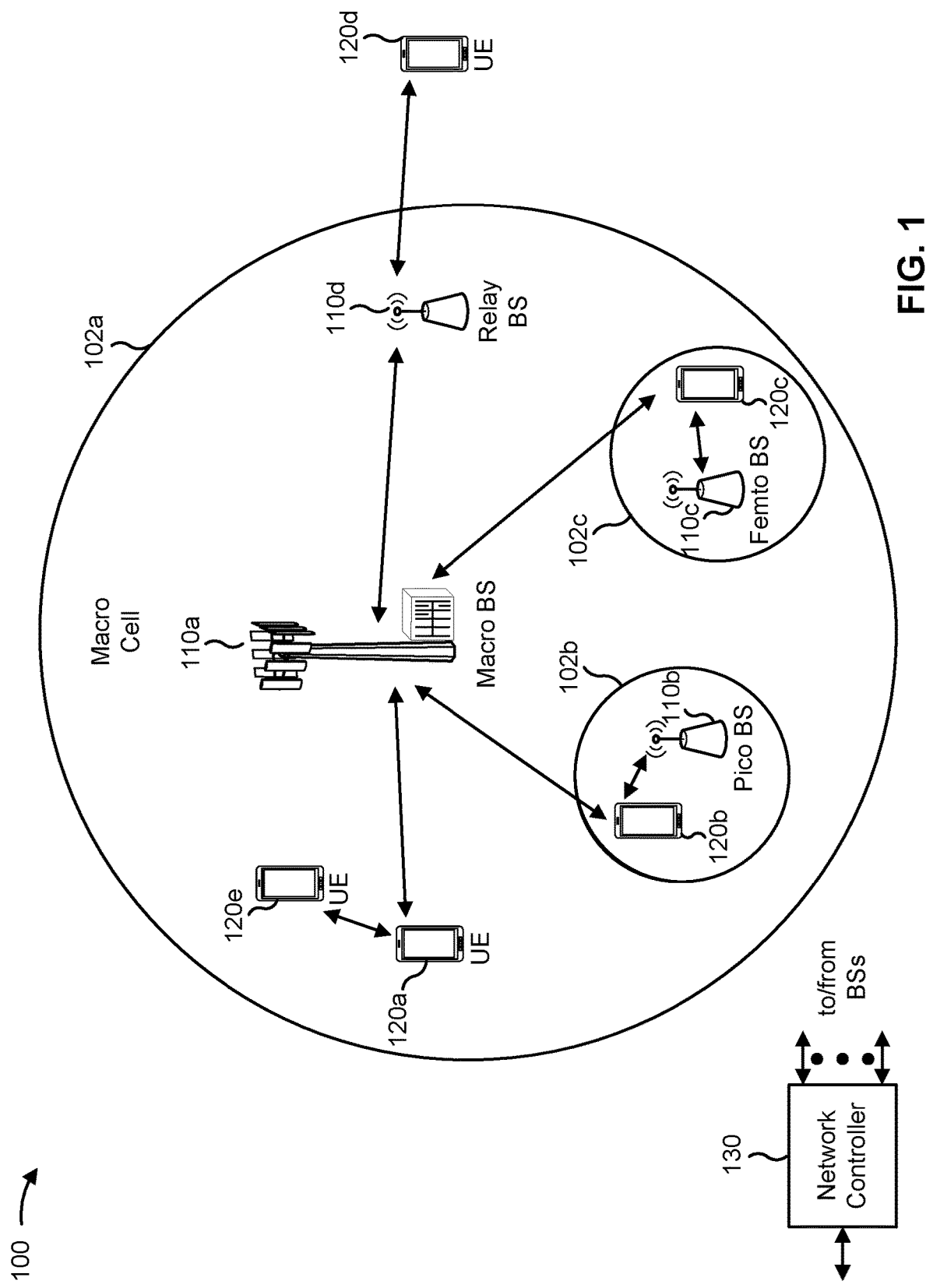
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
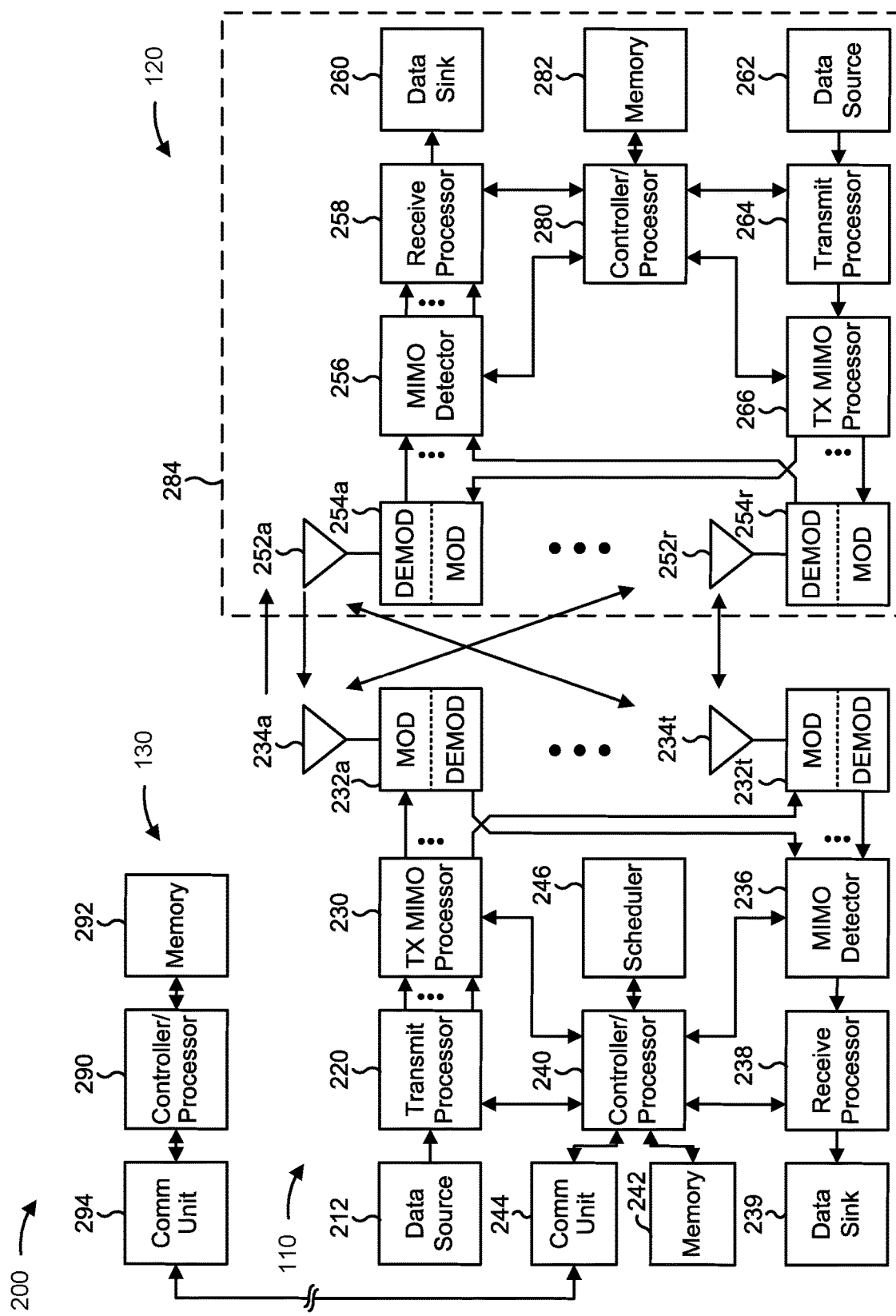
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with directional signal strength indication and beam-specific measurement threshold, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions.

In some aspects, the UE includes means for receiving configuration information for an RSSI measurement, the configuration information indicating a TCI state configuration for the RSSI measurement; means for performing the RSSI measurement based at least in part on the TCI state configuration; and/or means for transmitting a measurement report of the RSSI measurement. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, configuration information for an RSSI measurement, the configuration information indicating a TCI state configuration for the RSSI measurement; and/or means for receiving a measurement report of the RSSI measurement and the TCI state configuration. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

A UE may perform a cell selection or reselection procedure in order to identify a suitable cell for connection, mobility, or the like. The cell selection and reselection may utilize radio resource management (RRM) measurement. RRM measurement may facilitate proper cell selection/reselection for some radio access technologies (RATs), such as NR unlicensed (NR-U). RRM measurement may be based at least in part on the reception of a discovery reference signal (DRS) including a synchronization signal block (SSB) and/or a channel state information reference signal (CSI-RS). A UE may perform a measurement based at least in part on the DRS, and may transmit a measurement report of the measurement. The measurement report may include, for example, a reference signal received power (RSRP) and/or reference signal received quality (RSRQ).

Due to dynamically changing channel conditions in the unlicensed spectrum, some RRM measurement reporting may not be sufficient to reflect load conditions, interference outside downlink bursts, and potential hidden nodes in the unlicensed channel. To mitigate this issue, NR-U UEs can be configured to report an average received signal strength indicator (RSSI) and channel occupancy as a part of RRM measurements. The average RSSI may provide an estimation of load conditions and may provide information regarding overall interference on NR-U cells. The channel occupancy may be defined as a percentage of time when the channel is sensed to be busy (e.g., when the measured RSSI sample is above a predefined threshold). In some deployments, such as sub-7 GHz deployments, an omni-directional antenna is used at the UE, so the RSSI calculation is straightforward and channel occupancy is not particularly direction dependent. However, in deployments utilizing beamforming, such as mmWave, multiple beams may be used on the UE side, and different receive beams can have different RSSI values and, therefore, different channel occupancy. An omni-directional RSSI measurement configuration may fail to take into account RSSI values and channel occupancy across different receive beams, which reduces efficacy of the RSSI measurement and degrades network performance.

Some techniques and apparatuses described herein provide extension of RSSI measurement to a per-beam level. For example, a base station may configure a UE to perform RSSI measurement for one or more receive beams based at least in part on one or more transmission configuration indication (TCI) states, described in more detail elsewhere herein. The UE may perform RSSI measurement based at least in part on the one or more TCI states, and may transmit, to the BS, a measurement report. The measurement report may indicate per-beam RSSI information, as described in more detail elsewhere herein. In some aspects, the BS may refrain from transmitting one or more signals (e.g., any signal, any signal directed toward the UE 120, or the like) during a time interval associated with the RSSI measurement and/or using a TCI state indicated by configuration information. In this way, beam-based RSSI measurement and reporting provides information regarding RSSI values and channel occupancy across different receive beams, which improves efficacy of the RSSI measurement in beamforming based networks and improves network performance.

Figure 3:
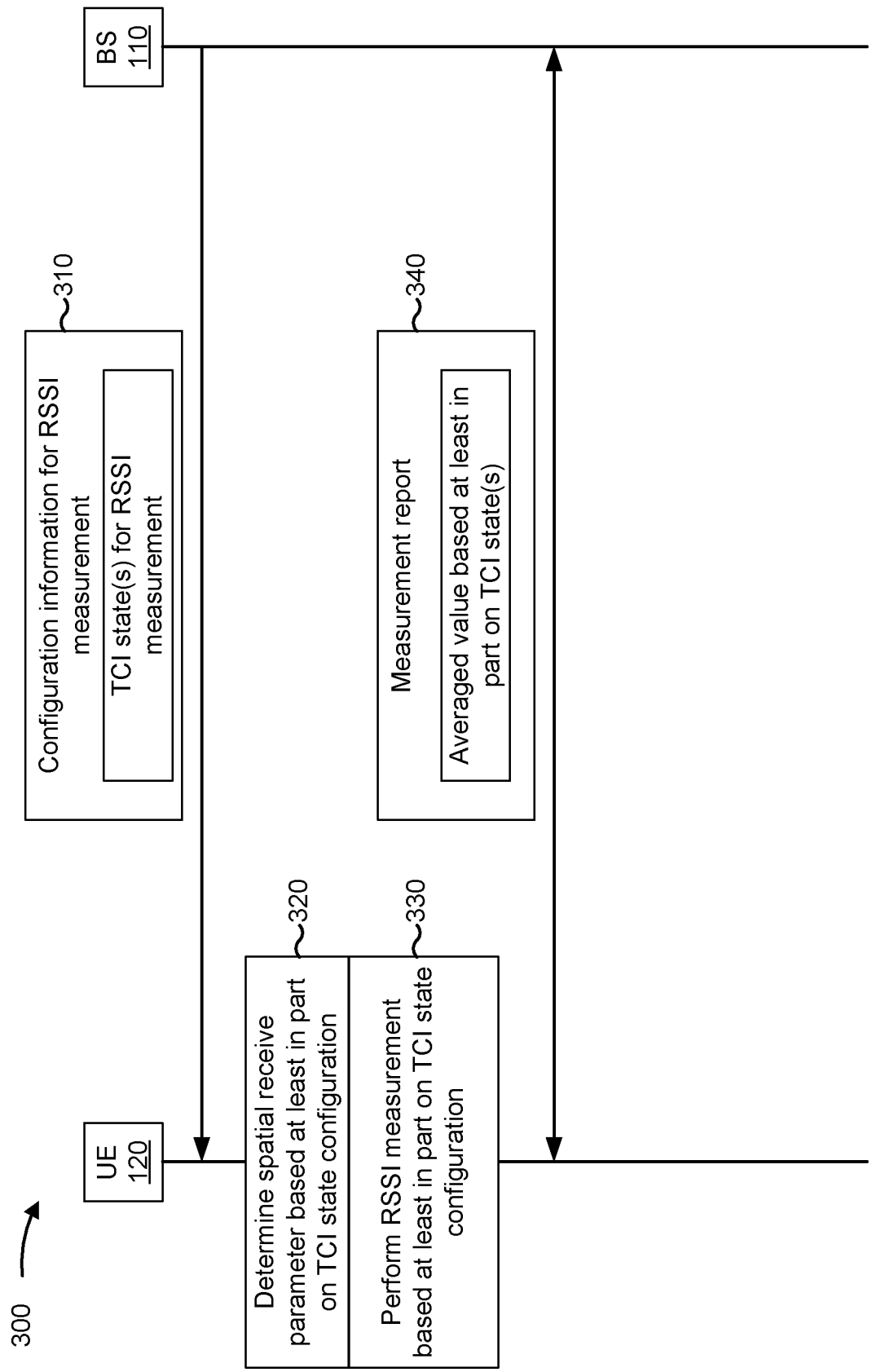
FIG. 3 is a diagram illustrating an example of per-beam received signal strength indication (RSSI) measurement and reporting, in accordance with the present disclosure.

FIG. 3 is a diagram illustrating an example 300 of per-beam RSSI measurement and reporting, in accordance with the present disclosure. As shown, FIG. 3 includes a UE 120 and a BS 110. In some aspects, UE 120 may include a UE capable of beamformed communication, such as a UE capable of using a mmWave RAT and/or the like.

As shown by reference number 310, the BS 110 may transmit, to the UE 120, configuration information for an RSSI measurement. As shown, the configuration information may indicate a TCI state configuration (e.g., one or more TCI states for RSSI measurement to be performed by the UE 120). The BS 110 may transmit the configuration information via one or more of radio resource control (RRC) signaling, medium access control (MAC) signaling, downlink control information (DCI), or the like. Generally, the configuration information may directly or indirectly indicate one or more beams on which to perform an RSSI measurement, a time interval in which to perform an RSSI measurement using a given beam, a reporting configuration for a measurement report, or the like. In some aspects, the configuration information may indicate a configuration for averaging of an RSSI measurement, as described in more detail below. An RSSI measurement indicates a total received power from all sources including interference and noise. An RSSI measurement using a given beam may indicate a total received power when using the given beam as a receive beam.

In some aspects, the configuration information may indicate one or more parameters related to RSSI measurement. For example, the configuration information may indicate a channel occupancy threshold (e.g., an RSSI threshold which is used for channel occupancy evaluation), a measurement duration in a number of symbols (e.g., a number of consecutive symbols for which a physical layer of the UE 120 is to report samples of RSSI), a reference subcarrier spacing and/or cyclic prefix to be used for RSSI measurements, an RSSI measurement timing configuration (RMTC) center frequency (sometimes referred to as a center frequency, and which indicates the center frequency of the measured bandwidth), an RMTC periodicity (e.g., indicating a periodicity for RSSI measurement), an RMTC subframe offset (e.g., indicating an RMTC subframe offset for a given frequency), one or more parameters used to determine a measurement result parameter (e.g., which may indicate a measured RSSI result in dBm and a channel occupancy indicator which may indicate a percentage of samples when the RSSI was above the configured channelOccupancyThreshold for the associated report configuration), or the like.

In some aspects, the configuration information may include a TCI state configuration. A TCI state configuration may indicate one or more TCI states and/or one or more time intervals associated with the one or more TCI states. Generally, a TCI state may be used to indicate a beam. For example, beam indication may be based at least in part on the configuration and downlink signaling of TCI states. A TCI state may derive quasi-colocation (QCL) information from a reference signal (such as a CSI-RS or an SSB). QCL information may define one or more parameters used for beam-based communication, such as one or more Doppler parameters, a spatial receive filter, or the like. By associating a certain downlink transmission (such as a physical downlink control channel (PDCCH) or a physical downlink shared channel (PDSCH)) with a certain TCI state, the BS 110 can inform the UE 120 to assume that the downlink transmission uses the same spatial filter as the reference signal associated with that TCI state. Thus, the UE 120 can determine the receive beam to use to receive the downlink transmission. Techniques and apparatuses described herein provide for the BS 110 to configure one or more TCI states for RSSI measurement by the UE 120, such that the UE 120 performs RSSI measurement by monitoring or sampling one or more beams defined by the one or more TCI states (e.g., in one or more time intervals indicated by the configuration information).

In some aspects, one or more of the parameters relating to RSSI described above may be configured for a TCI state or a TCI state group. For example, a measurement reporting configuration may be configured for a TCI state or for a TCI state group, such that different TCI states or TCI state groups can have different thresholds for channel occupancy determination or measurement reporting. As another example, an RMTC, an RMTC periodicity, an RMTC subframe offset, and/or a measurement duration may be configured for a TCI state or for a TCI state group, such that different TCI states or TCI state groups can have different values of such parameters. In such a case, in some aspects, the center frequency, reference subcarrier spacing, and cyclic prefix type (e.g., reference cyclic prefix) may be the same across two or more TCI states or TCI state groups (e.g., all configured TCI states or TCI state groups). In some aspects, one or more parameters used to determine a measurement result parameter (e.g., which may indicate a measured RSSI result in dBm and a channel occupancy indicator which may indicate a percentage of samples when the RSSI was above the configured channelOccupancyThreshold for the associated report configuration) may be configured for a TCI state or TCI state group, such that different TCI states or TCI state groups can have different thresholds regarding channel occupancy or measurement reporting. Thus, RMTC parameters may be extended to apply to beam-level RSSI.

In some aspects, a parameter associated with RSSI measurement may be selected from a set of values based at least in part on the RSSI measurement being configured with a TCI state configuration. As one example, a measurement duration may have a larger range of possible values than can be configured (e.g., 84 symbols, 98 symbols, 114 symbols, or the like) than an omni-directional RSSI measurement, where "larger range" refers to measurement durations that include more symbols than measurement durations for the omni-directional RSSI measurement. As a second example, a reference subcarrier spacing may have a larger range of possible values that can be configured (e.g., 120 kHz, 240 kHz, or the like) than an omni-directional RSSI measurement, where "larger range" refers to reference subcarrier spacings that are wider than subcarrier spacings for the omni-directional RSSI measurement.

In some aspects, the configuration information may indicate a beam sweeping configuration for the RSSI measurement. "Beam sweeping" refers to communication (e.g., performing RSSI measurement) using different beams at different time intervals, such that a range of directions are utilized across the different time intervals. For a more detailed description of beam sweeping, refer to the description accompanying FIG. 6.

As shown by reference number 320, the UE 120 may determine one or more spatial receive parameters based at least in part on the TCI state configuration. For example, if the TCI state configuration identifies a TCI state to be used for RSSI measurement at a given time, the UE 120 may identify QCL information based at least in part on a reference signal identified by the TCI state. The UE 120 may use the QCL information to determine a spatial receive filter for the RSSI measurement. The UE 120 may set the spatial receive filter corresponding to the TCI state indicated by the BS 110.

As shown by reference number 330, the UE 120 may perform the RSSI measurement based at least in part on the TCI state configuration. For example, the UE 120 may apply a spatial receive filter determined in connection with reference number 320, and may determine an RSSI measurement based at least in part on the spatial receive filter (e.g., by collecting a set of measurement samples while applying the spatial receive filter, and determining the RSSI measurement using the set of measurement samples). In some aspects, the UE 120 may perform an increased number or an increased rate of measurement samples for the beam-based RSSI measurement than for an omni-directional RSSI measurement. In some aspects, the BS 110 may refrain from transmitting one or more signals (e.g., any signal, any signal directed toward the UE 120, or the like) during a time interval associated with the RSSI measurement and/or using a TCI state indicated by the configuration information.

In some aspects, the RSSI measurement may be based at least in part on an averaged value. As a first example, the UE 120 may determine an averaged RSSI measurement if a TCI state for an RSSI measurement is the same over a duration of T milliseconds (where Tis configurable, preconfigured, specified, or the like), and may not perform averaging across TCI states. As a second example, the UE 120 may determine an averaged RSSI measurement if the same receive beam at the UE 120 is used for values contributing to the averaged RSSI measurement. As a third example, the UE 120 may determine an averaged value if the same UE receive beam is used for values contributing to the averaged RSSI measurement, and if a difference associated with the averaged RSSI measurement (e.g., a range of RSSI values, a deviation of the RSSI values, or the like) satisfies (e.g., is less than) a threshold, which may be configured, pre-configured, specified, or the like. In the second example and the third example, the UE 120 may report an RSSI beam group associated with the averaged RSSI measurement. In some aspects, the UE 120 may not perform averaging of RSSI measurements, even within a TCI state.

As shown by reference number 340, the UE 120 may transmit a measurement report on the RSSI measurement. For example, the measurement report may indicate one or more measurement values determined based at least in part on the configuration information. In some aspects, the measurement report may include one or more values based at least in part on a measurement result parameter, as described in more detail in connection with reference number 310, above. As further shown, in some aspects, the measurement report may indicate an averaged value based at least in part on the TCI state configuration. For example, if the UE 120 determines an averaged value, as described in connection with reference number 330, above, the UE 120 may report information indicating the averaged value and/or information regarding the averaged value, such as an RSSI beam group, TCI information, or the like. In some aspects, the BS 110 may perform one or more operations based at least in part on the measurement report, such as triggering cell selection or reselection, a mobility operation, or the like.

As indicated above, FIG. 3 is provided as an example. Other examples may differ from what is described with regard to FIG. 3.

Figure 4:
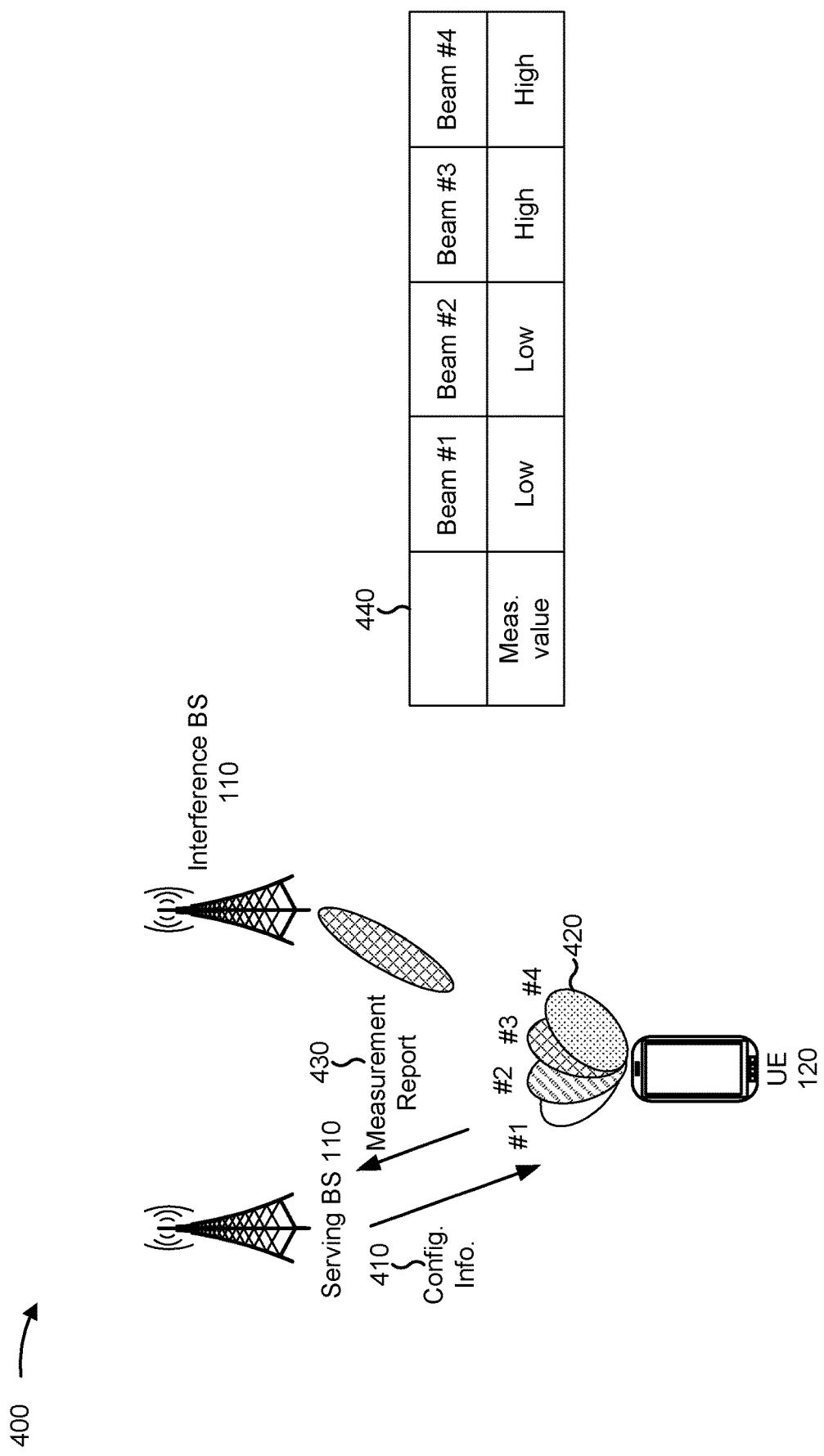
FIG. 4 is a diagram illustrating an example of per-beam RSSI measurement and reporting, in accordance with the present disclosure.

FIG. 4 is a diagram illustrating an example 400 of per-beam RSSI measurement and reporting, in accordance with the present disclosure. Example 400 includes a serving BS 110, an interference BS 110, and a UE 120. As shown by reference number 410, the serving B S 110 may transmit configuration information to the UE 120, such as the configuration information shown by reference number 310 of FIG. 3. As shown by reference number 420, the UE 120 may perform RSSI measurement using a plurality of beams, such as based at least in part on a TCI state configuration provided by the configuration information. For example, the UE 120 may perform RSSI measurement using beams 1, 2, 3, and 4. As shown by reference number 430, the UE 120 may transmit a measurement report based at least in part on the RSSI measurement. The measurement report may indicate measurement values determined on beams 1, 2, 3, and 4, as shown by reference number 440. Thus, the serving BS 110 can identify particular beams, directions, or the like, associated with higher interference (e.g., beams 3 and 4, in example 400), and take appropriate action based at least in part on the particular beams, directions, or the like.

As indicated above, FIG. 4 is provided as an example. Other examples may differ from what is described with regard to FIG. 4.

Figure 5:
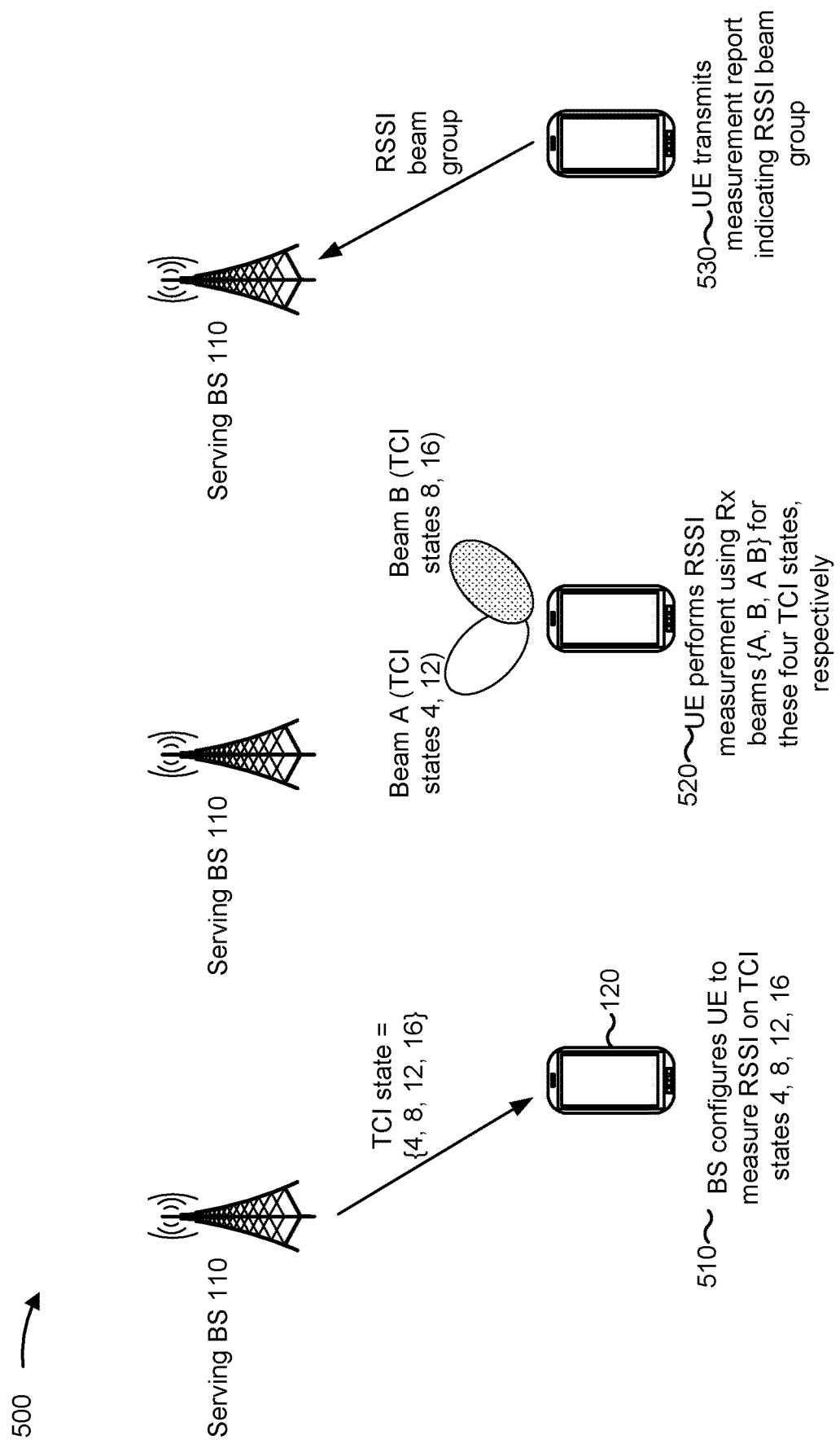
FIG. 5 is a diagram illustrating an example of per-beam RSSI measurement and reporting, in accordance with the present disclosure.

FIG. 5 is a diagram illustrating an example 500 of per-beam RSSI measurement and reporting, in accordance with the present disclosure. As shown, example 500 includes a serving BS 110 and a UE 120. As shown by reference number 510, the BS 110 may configure the UE 120 (e.g., via configuration information such as configuration information shown by reference number 310) to measure RSSI based at least in part on four TCI states: TCI states 4, 8, 12, and 16. As shown by reference number 520, the UE 120 may perform RSSI measurements using Beam A (e.g., for TCI states 4 and 12) and Beam B (e.g., for TCI states 8 and 16) based at least in part on the four TCI states, where TCI states 4, 8, 12, and 16 correspond to Beam {A, B, A, B}. If the UE 120 is permitted to determine an averaged value if the same UE receive beam is used, then the UE 120 may determine a first averaged value for the RSSI measurement corresponding to Beam A, and a second averaged value for the RSSI measurement corresponding to Beam B. As shown by reference number 530, the UE 120 may transmit a measurement report, including an indication of an RSSI beam group (e.g., Beam A for TCI states 4 and 12, and Beam B for TCI states 8 and 16). An RSSI beam group is a set of beams used to determine one or more RSSI measurements associated with a measurement report. Thus, the UE 120 reports information indicating beams corresponding to the RSSI measurements determined by the UE 120, which enables the BS 110 to take appropriate action based at least in part on the beams corresponding to the RSSI measurements.

As indicated above, FIG. 5 is provided as an example. Other examples may differ from what is described with regard to FIG. 5.

Figure 6:
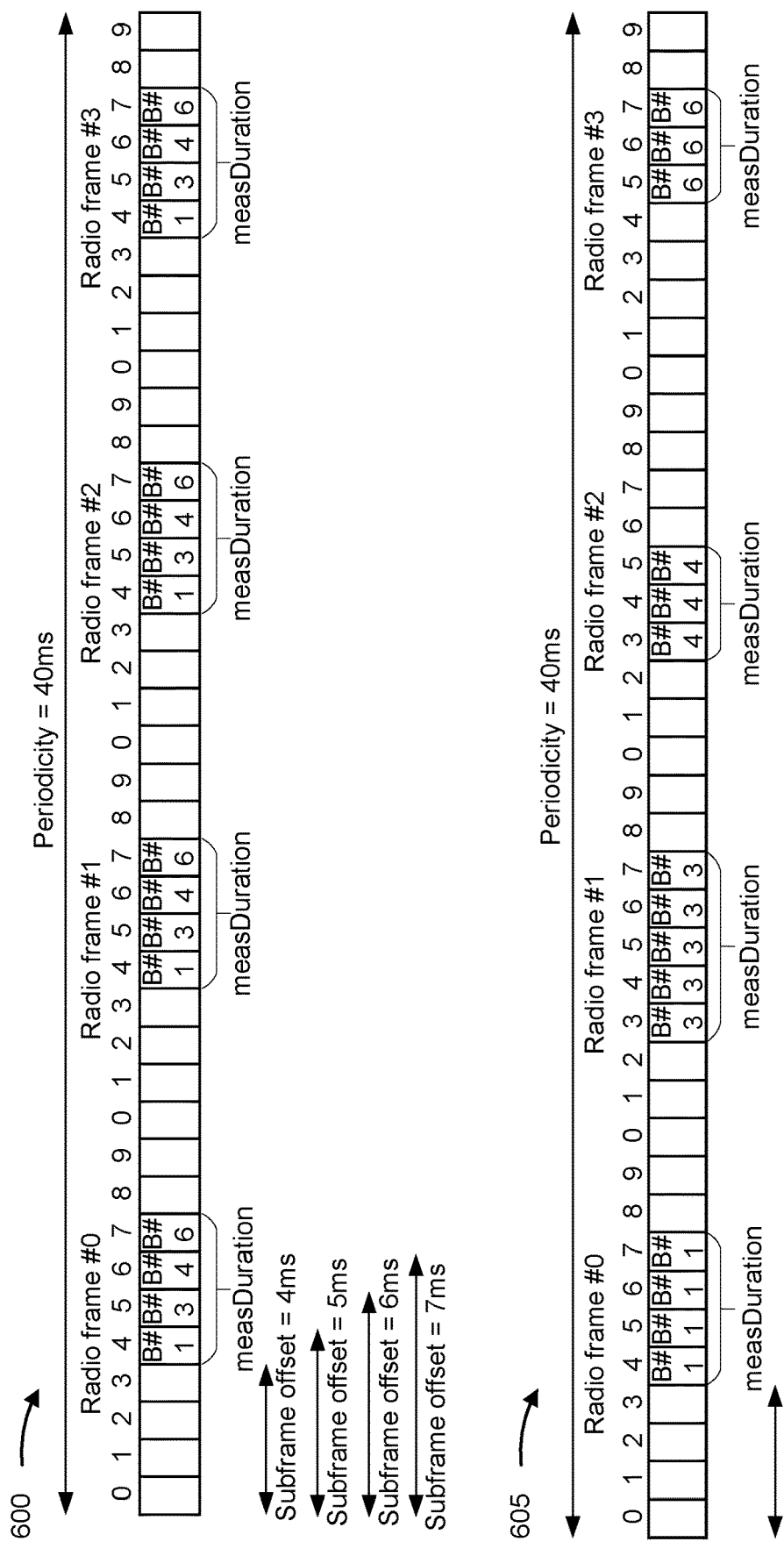
FIG. 6 is a diagram illustrating examples of per-beam RSSI measurement and reporting, in accordance with the present disclosure.

FIG. 6 is a diagram illustrating examples 600 and 605 of per-beam RSSI measurement and reporting, in accordance with the present disclosure. Examples 600 and 605 show potential beam-sweeping configurations for RSSI measurement, such as may be configured in connection with the operations of FIGS. 3-5. In examples 600 and 605, an RMTC periodicity (also referred to herein as a measurement periodicity or a periodicity) of 40 ms is used. A UE (e.g., UE 120) may perform beam sweeping within a single RMTC periodicity, in examples 600 and 605, and in other examples described herein (e.g., examples 300, 400, and/or 500). Furthermore, radio frames #0, #1, #2, and #3 are shown, and each radio frame includes 10 subframes. RSSI measurements may be configured to be performed in a measurement duration, shown as "measDuration," which may be defined by a number of symbols, as described in connection with FIG. 3. In examples 600 and 605, RSSI measurements are performed for a Beam 1 (B #1), a Beam 3 (B #3), a Beam 4 (B #4) and a Beam 6 (B #6).

In some aspects, RSSI measurement symbols may be non-consecutive for each TCI state in a given RMTC periodicity. An RSSI measurement symbol (also referred to as a measurement symbol) is a symbol in which an RSSI measurement is performed. Example 600 shows non-consecutive RSSI measurement symbols. As shown, in a given measurement duration, RSSI measurements are performed for Beam 1, Beam 3, Beam 4, and Beam 6. In example 600, an RMTC for each of the RSSI measurements can be configured identically per TCI state, with the exception of a subframe offset. For example, the RSSI measurements may have a same RTMC and different subframe offsets. For example, the subframe offset may be configured so that no overlap in the time domain occurs among TCI states, as shown by the respective subframe offsets of 4, 5, 6, and 7 ms.

In some aspects, RSSI measurement symbols may be consecutive for each TCI state in one periodicity. Example 605 shows consecutive RSSI measurement symbols. As shown, in a given measurement duration, RSSI measurements are performed for only one of Beam 1, Beam 3, Beam 4, or Beam 6. When RSSI measurements are performed consecutively, the RMTC can be configured differently per TCI state, such as using different measurement durations (e.g., 4 subframes for Beam 1 versus three subframes for Beam 4).

As indicated above, FIG. 6 is provided as an example. Other examples may differ from what is described with regard to FIG. 6.

Figure 7:
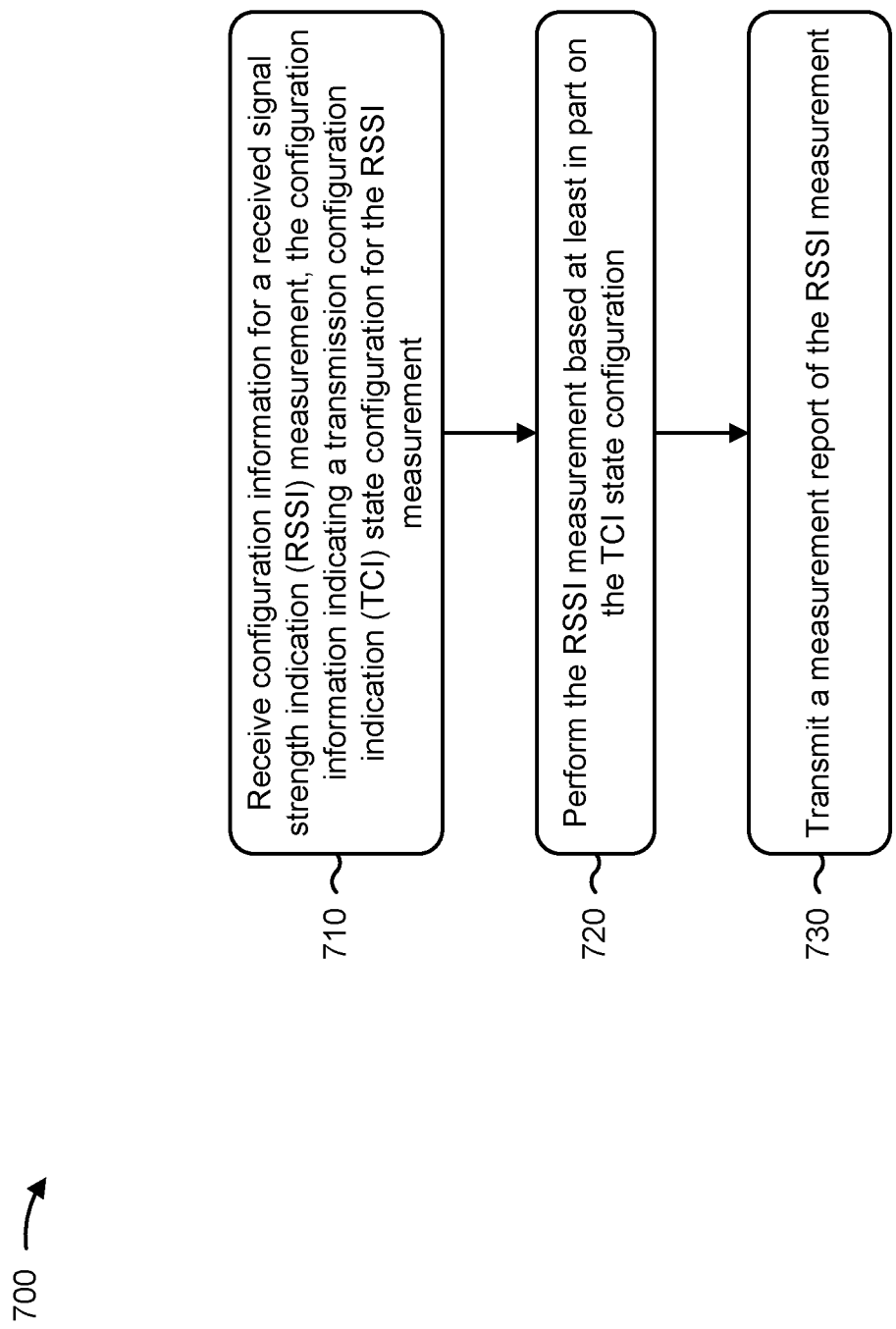
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with directional signal strength indication and beam-specific measurement threshold.

As shown in FIG. 7, in some aspects, process 700 may include receiving configuration information for an RSSI measurement, the configuration information indicating a TCI state configuration for the RSSI measurement (block 710). For example, the UE (e.g., using reception component 902, depicted in FIG. 9) may receive configuration information for an RSSI measurement, the configuration information indicating a TCI state configuration for the RSSI measurement, as described above.

As further shown in FIG. 7, in some aspects, process 700 may include performing the RSSI measurement based at least in part on the TCI state configuration (block 720). For example, the UE (e.g., using measurement component 908, depicted in FIG. 9) may perform the RSSI measurement based at least in part on the TCI state configuration, as described above.

As further shown in FIG. 7, in some aspects, process 700 may include transmitting a measurement report of the RSSI measurement (block 730). For example, the UE (e.g., using transmission component 904, depicted in FIG. 9) may transmit a measurement report of the RSSI measurement, as described above.

Process 700 may include additional aspects, such as any single aspect or any combination of aspects described below and/or in connection with one or more other processes described elsewhere herein.

In a first aspect, the measurement report includes an averaged value over a measurement duration based at least in part on the RSSI measurement being associated with a same TCI state for the measurement duration.

In a second aspect, alone or in combination with the first aspect, the measurement report includes an averaged value based at least in part on multiple RSSI measurements associated with a same receive beam of the UE, and the measurement report indicates an RSSI beam group associated with the averaged value.

In a third aspect, alone or in combination with one or more of the first and second aspects, the measurement report includes an averaged value based at least in part on multiple RSSI measurements that are associated with a same receive beam of the UE and are within a threshold value of each other, and the measurement report indicates an RSSI beam group associated with the averaged value.

In a fourth aspect, alone or in combination with one or more of the first through third aspects, the measurement report indicates a discrete measurement value.

In a fifth aspect, alone or in combination with one or more of the first through fourth aspects, the configuration information indicates, for each TCI state or TCI state group, at least one of a measurement reporting threshold, an RSSI measurement timing configuration, or a measured RSSI result and a channel occupancy indicator.

In a sixth aspect, alone or in combination with one or more of the first through fifth aspects, for two or more TCI states or TCI state groups, the RSSI measurement timing configuration is associated with at least one of a same center frequency, a same reference subcarrier spacing, or a same cyclic prefix type.

In a seventh aspect, alone or in combination with one or more of the first through sixth aspects, the configuration information indicates a measurement duration of the RSSI measurement of at least 84 measurement symbols.

In an eighth aspect, alone or in combination with one or more of the first through seventh aspects, the configuration information indicates a reference subcarrier spacing of the RSSI measurement of at least 120 kilohertz.

In a ninth aspect, alone or in combination with one or more of the first through eighth aspects, the configuration information indicates a first TCI state and a second TCI state for the RSSI measurement, wherein a set of RSSI measurement symbols for the first TCI state are consecutive with each other, and wherein a set of RSSI measurement symbols for the second TCI state are consecutive with each other.

In a tenth aspect, alone or in combination with one or more of the first through ninth aspects, the first TCI state and the second TCI state are associated with different RSSI measurement timing configurations.

In an eleventh aspect, alone or in combination with one or more of the first through tenth aspects, the configuration information indicates a first TCI state and a second TCI state for the RSSI measurement, wherein a set of RSSI measurement symbols for the first TCI state are non-consecutive with each other.

In a twelfth aspect, alone or in combination with one or more of the first through eleventh aspects, the first TCI state and the second TCI state are associated with a same RSSI measurement timing configuration and different subframe offsets, wherein the different subframe offsets are configured such that the set of RSSI measurement symbols for the first TCI state is non-overlapped with a set of measurement symbols for the second TCI state.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
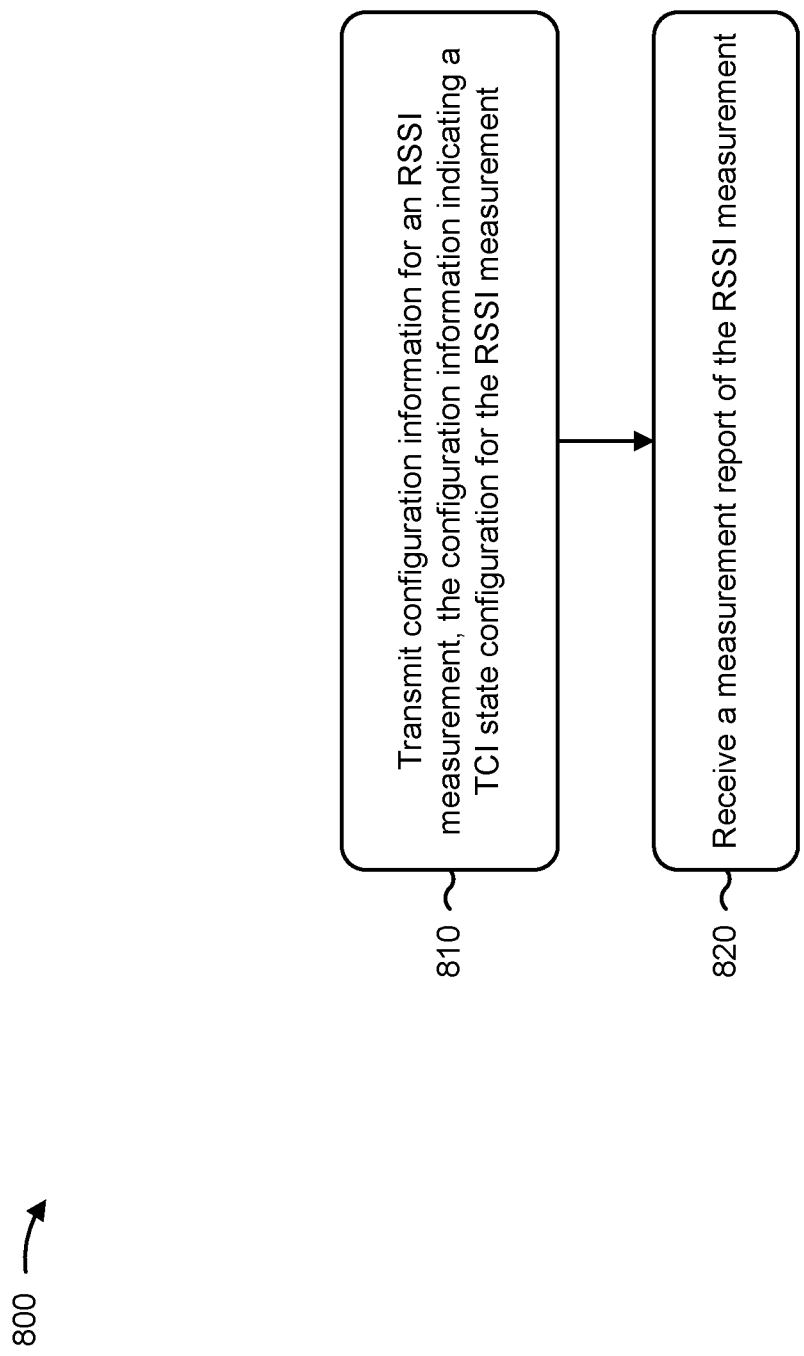
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with directional signal strength indication and beam-specific measurement threshold.

As shown in FIG. 8, in some aspects, process 800 may include transmitting, to a UE, configuration information for an RSSI measurement, the configuration information indicating a TCI state configuration for the RSSI measurement (block 810). For example, the base station (e.g., using transmission component 1004, depicted in FIG. 10) may transmit, to a UE, configuration information for an RSSI measurement, the configuration information indicating a TCI state configuration for the RSSI measurement, as described above.

As further shown in FIG. 8, in some aspects, process 800 may include receiving a measurement report of the RSSI measurement and the TCI state configuration (block 820). For example, the base station (e.g., using reception component 1002, depicted in FIG. 10) may receive a measurement report of the RSSI measurement and the TCI state configuration, as described above. In some aspects, the BS may refrain from transmitting one or more signals (e.g., any signal, any signal directed toward the UE 120, or the like) during a time interval associated with the RSSI measurement and/or using a TCI state indicated by the configuration information.

Process 800 may include additional aspects, such as any single aspect or any combination of aspects described below and/or in connection with one or more other processes described elsewhere herein.

In a first aspect, the measurement report includes an averaged value over a measurement duration based at least in part on the RSSI measurement being associated with a same TCI state for the measurement duration.

In a second aspect, alone or in combination with the first aspect, the measurement report includes an averaged value based at least in part on multiple RSSI measurements associated with a same receive beam of the UE, and the measurement report indicates an RSSI beam group associated with the averaged value.

In a third aspect, alone or in combination with one or more of the first and second aspects, the measurement report includes an averaged value based at least in part on multiple RSSI measurements that are associated with a same receive beam of the UE and are within a threshold value of each other, and the measurement report indicates an RSSI beam group associated with the averaged value.

In a fourth aspect, alone or in combination with one or more of the first through third aspects, the measurement report indicates a discrete measurement value.

In a fifth aspect, alone or in combination with one or more of the first through fourth aspects, the configuration information indicates, for each TCI state or TCI state group, at least one of a measurement reporting threshold, an RSSI measurement timing configuration, or a measured RSSI result and a channel occupancy indicator.

In a sixth aspect, alone or in combination with one or more of the first through fifth aspects, for two or more TCI states or TCI state groups, the RSSI measurement timing configuration is associated with at least one of a same center frequency, a same reference subcarrier spacing, or a same cyclic prefix type.

In a seventh aspect, alone or in combination with one or more of the first through sixth aspects, the configuration information indicates a measurement duration of the RSSI measurement of at least 84 measurement symbols.

In an eighth aspect, alone or in combination with one or more of the first through seventh aspects, the configuration information indicates a reference subcarrier spacing of the RSSI measurement of at least 120 kilohertz.

In a ninth aspect, alone or in combination with one or more of the first through eighth aspects, the configuration information indicates a first TCI state and a second TCI state for the RSSI measurement, wherein a set of RSSI measurement symbols for the first TCI state are consecutive with each other, and wherein a set of RSSI measurement symbols for the second TCI state are consecutive with each other.

In a tenth aspect, alone or in combination with one or more of the first through ninth aspects, the first TCI state and the second TCI state are associated with different RSSI measurement timing configurations.

In an eleventh aspect, alone or in combination with one or more of the first through tenth aspects, the configuration information indicates a first TCI state and a second TCI state for the RSSI measurement, wherein a set of RSSI measurement symbols for the first TCI state are non-consecutive with each other.

In a twelfth aspect, alone or in combination with one or more of the first through eleventh aspects, the first TCI state and the second TCI state are associated with a same RSSI measurement timing configuration and different subframe offsets, wherein the different subframe offsets are configured such that the set of RSSI measurement symbols for the first TCI state is non-overlapped with a set of measurement symbols for the second TCI state.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
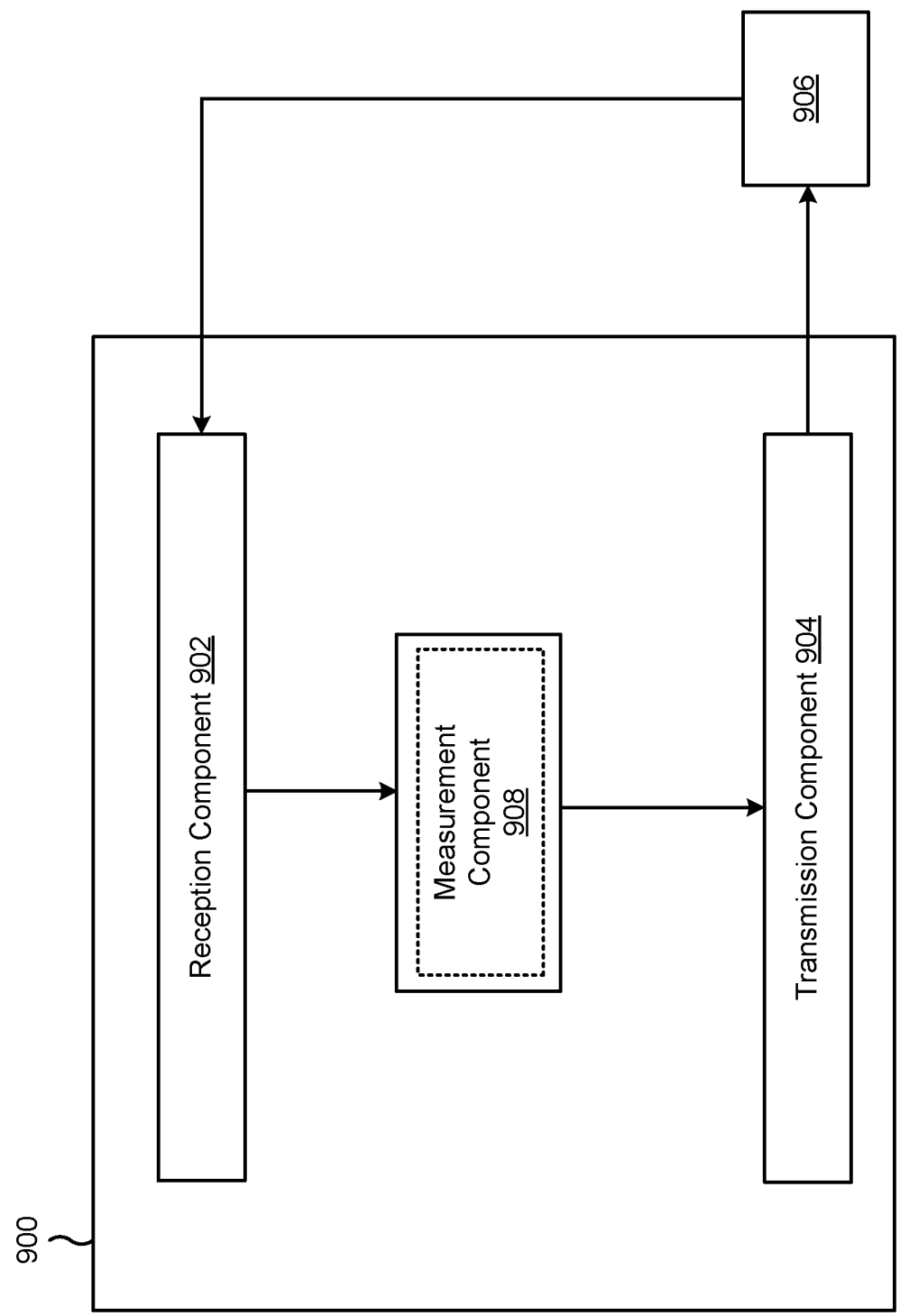
FIG. 9 is a block diagram of an example apparatus for wireless communication, in accordance with the present disclosure.

FIG. 9 is a block diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a measurement component 908, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive configuration information for an RSSI measurement, the configuration information indicating a TCI state configuration for the RSSI measurement. The measurement component 908 may perform the RSSI measurement based at least in part on the TCI state configuration. The transmission component 904 may transmit a measurement report of the RSSI measurement.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
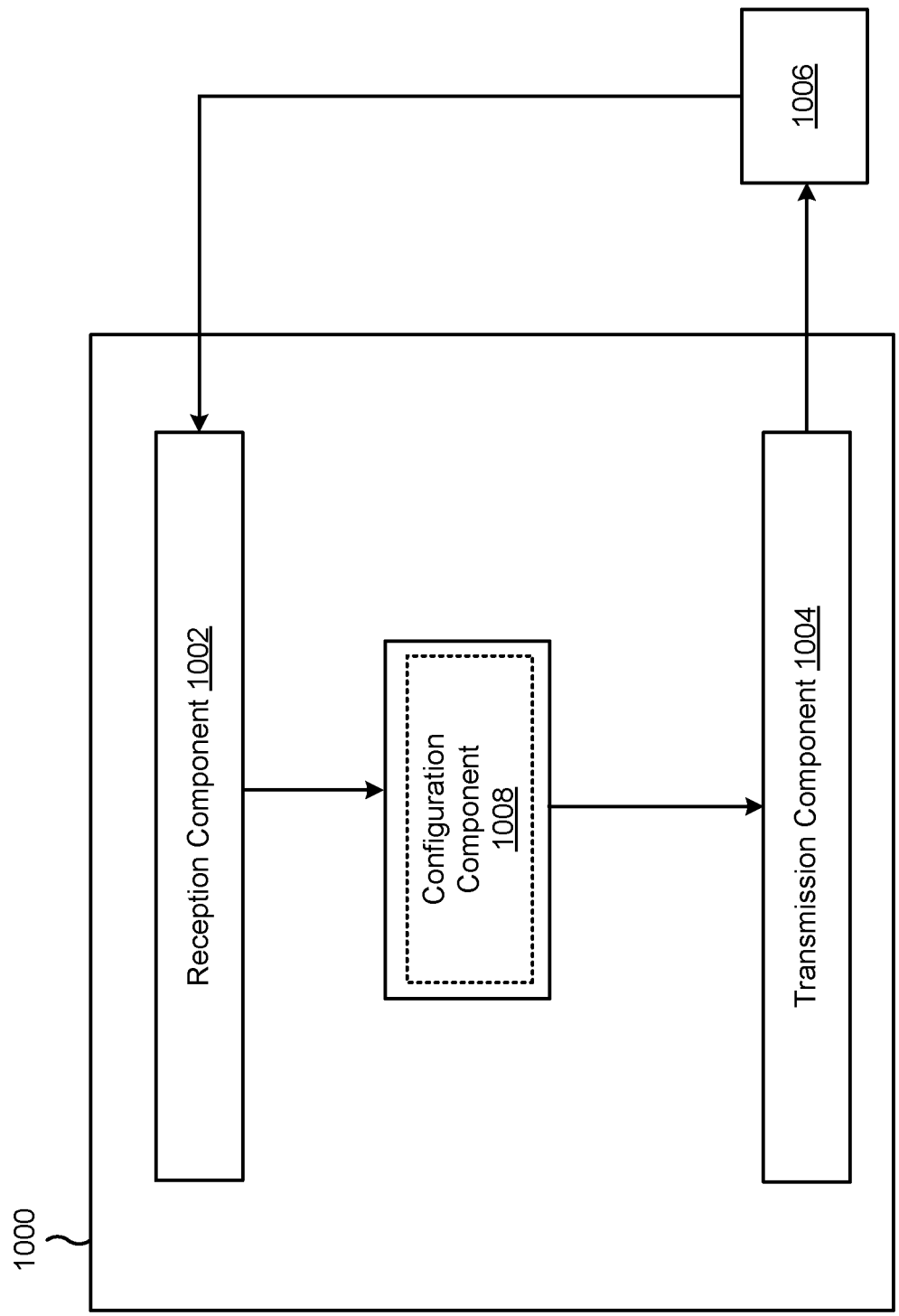
FIG. 10 is a block diagram of an example apparatus for wireless communication, in accordance with the present disclosure.

FIG. 10 is a block diagram of an example apparatus 1000 for wireless communication, in accordance with the present disclosure. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a configuration component 1008, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 or the configuration component 1008 may transmit, to a UE, configuration information for an RSSI measurement, the configuration information indicating a TCI state configuration for the RSSI measurement. The reception component 1002 may receive a measurement report of the RSSI measurement and the TCI state configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a user equipment (UE), comprising: receiving configuration information for a received signal strength indication (RSSI) measurement, the configuration information indicating a transmission configuration indication (TCI) state configuration for the RSSI measurement; performing the RSSI measurement based at least in part on the TCI state configuration; and transmitting a measurement report of the RSSI measurement.

Aspect 2: The method of aspect 1, wherein the measurement report includes an averaged value over a measurement duration based at least in part on the RSSI measurement being associated with a same TCI state for the measurement duration.

Aspect 3: The method of any of aspects 1-2, wherein the measurement report includes an averaged value based at least in part on multiple RSSI measurements associated with a same receive beam of the UE, and wherein the measurement report indicates an RSSI beam group associated with the averaged value.

Aspect 4: The method of any of aspects 1-3, wherein the measurement report includes an averaged value based at least in part on multiple RSSI measurements that are associated with a same receive beam of the UE and are within a threshold value of each other, and wherein the measurement report indicates an RSSI beam group associated with the averaged value.

Aspect 5: The method of aspect 1, wherein the measurement report indicates a discrete measurement value.

Aspect 6: The method of any of aspects 1-5, wherein the configuration information indicates, for each TCI state or TCI state group, at least one of: a measurement reporting threshold, an RSSI measurement timing configuration, or a measured RSSI result and a channel occupancy indicator.

Aspect 7: The method of aspect 6, wherein, for two or more TCI states or TCI state groups, the RSSI measurement timing configuration is associated with at least one of: a same center frequency, a same reference subcarrier spacing, or a same cyclic prefix type.

Aspect 8: The method of any of aspects 1-7, wherein the configuration information indicates a measurement duration of the RSSI measurement of at least 84 measurement symbols.

Aspect 9: The method of any of aspects 1-8, wherein the configuration information indicates a reference subcarrier spacing of the RSSI measurement of at least 120 kilohertz.

Aspect 10: The method of any of aspects 1-9, wherein the configuration information indicates a first TCI state and a second TCI state for the RSSI measurement, wherein a set of RSSI measurement symbols for the first TCI state are consecutive with each other, and wherein a set of RSSI measurement symbols for the second TCI state are consecutive with each other.

Aspect 11: The method of aspect 10, wherein the first TCI state and the second TCI state are associated with different RSSI measurement timing configurations.

Aspect 12: The method of any of aspects 1-11, wherein the configuration information indicates a first TCI state and a second TCI state for the RSSI measurement, wherein a set of RSSI measurement symbols for the first TCI state are non-consecutive with each other.

Aspect 13: The method of aspect 12, wherein the first TCI state and the second TCI state are associated with a same RSSI measurement timing configuration and different subframe offsets, wherein the different subframe offsets are configured such that the set of RSSI measurement symbols for the first TCI state is non-overlapped with a set of measurement symbols for the second TCI state.

Aspect 14: A method of wireless communication performed by a base station, comprising: transmitting, to a user equipment (UE), configuration information for a received signal strength indication (RSSI) measurement, the configuration information indicating a transmission configuration indication (TCI) state configuration for the RSSI measurement; and receiving a measurement report of the RSSI measurement and the TCI state configuration.

Aspect 15: The method of aspect 14, wherein the measurement report includes an averaged value over a measurement duration based at least in part on the RSSI measurement being associated with a same TCI state for the measurement duration.

Aspect 16: The method of any of aspects 14-15, wherein the measurement report includes an averaged value based at least in part on multiple RSSI measurements associated with a same receive beam of the UE, and wherein the measurement report indicates an RSSI beam group associated with the averaged value.

Aspect 17: The method of any of aspects 14-16, wherein the measurement report includes an averaged value based at least in part on multiple RSSI measurements that are associated with a same receive beam of the UE and are within a threshold value of each other, and wherein the measurement report indicates an RSSI beam group associated with the averaged value.

Aspect 18: The method of aspect 14, wherein the measurement report indicates a discrete measurement value.

Aspect 19: The method of any of aspects 14-18, wherein the configuration information indicates, for each TCI state or TCI state group, at least one of: a measurement reporting threshold, an RSSI measurement timing configuration, or a measured RSSI result and a channel occupancy indicator.

Aspect 20: The method of aspect 19, wherein, for two or more TCI states or TCI state groups, the RSSI measurement timing configuration is associated with at least one of: a same center frequency, a same reference subcarrier spacing, or a same cyclic prefix type.

Aspect 21: The method of any of aspects 14-20, wherein the configuration information indicates a measurement duration of the RSSI measurement of at least 84 measurement symbols.

Aspect 22: The method of any of aspects 14-21, wherein the configuration information indicates a reference subcarrier spacing of the RSSI measurement of at least 120 kilohertz.

Aspect 23: The method of any of aspects 14-22, wherein the configuration information indicates a first TCI state and a second TCI state for the RSSI measurement, wherein a set of RSSI measurement symbols for the first TCI state are consecutive with each other, and wherein a set of RSSI measurement symbols for the second TCI state are consecutive with each other.

Aspect 24: The method of aspect 23, wherein the first TCI state and the second TCI state are associated with different RSSI measurement timing configurations.

Aspect 25: The method of any of aspects 14-24, wherein the configuration information indicates a first TCI state and a second TCI state for the RSSI measurement, wherein a set of RSSI measurement symbols for the first TCI state are non-consecutive with each other.

Aspect 26: The method of aspect 25, wherein the first TCI state and the second TCI state are associated with a same RSSI measurement timing configuration and different subframe offsets, wherein the different subframe offsets are configured such that the set of RSSI measurement symbols for the first TCI state is non-overlapped with a set of measurement symbols for the second TCI state.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the memory and the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving configuration information for a received signal strength indication (RSSI) measurement, the configuration information indicating a transmission configuration indication (TCI) state configuration for the RSSI measurement, wherein the TCI state configuration corresponds to a receive beam of the UE, and wherein the configuration information further indicates a measurement duration for an averaged value of the RSSI measurement, wherein the measurement duration is indicated as at least 84 measurement symbols;
   performing the RSSI measurement on the receive beam based at least in part on the TCI state configuration; and transmitting a measurement report of the RSSI measurement.

2. The method of claim 1, wherein the measurement report includes the averaged value of the RSSI measurement over the measurement duration based at least in part on the RSSI measurement being associated with a same TCI state for the measurement duration.

3. The method of claim 1, wherein the measurement report includes the averaged value of the RSSI measurement based at least in part on multiple RSSI measurements associated with a same receive beam of the UE, and wherein the measurement report indicates an RS SI beam group associated with the averaged value.

4. The method of claim 1, wherein the measurement report includes the averaged value of the RS SI measurement based at least in part on multiple RSSI measurements that are associated with a same receive beam of the UE and are within a threshold value of each other, and wherein the measurement report indicates an RSSI beam group associated with the averaged value.

5. The method of claim 1, wherein the measurement report indicates a discrete measurement value.

6. The method of claim 1, wherein the configuration information indicates, for each TCI state or TCI state group, at least one of:
a measurement reporting threshold,
an RS SI measurement timing configuration, or
a channel occupancy indicator.

7. The method of claim 6, wherein, for two or more TCI states or TCI state groups, the RS SI measurement timing configuration is associated with at least one of:
a same center frequency,
a same reference subcarrier spacing, or
a same cyclic prefix type.

8. The method of claim 1, wherein the configuration information indicates a reference subcarrier spacing of the RSSI measurement of at least 120 kilohertz.

9. The method of claim 1, wherein the configuration information indicates a first TCI state and a second TCI state for the RSSI measurement, wherein a set of RSSI measurement symbols for the first TCI state are consecutive with each other, and wherein a set of RSSI measurement symbols for the second TCI state are consecutive with each other.

10. The method of claim 9, wherein the first TCI state and the second TCI state are associated with different RSSI measurement timing configurations.

11. The method of claim 1, wherein the configuration information indicates a first TCI state and a second TCI state for the RSSI measurement, wherein a set of RSSI measurement symbols for the first TCI state are non-consecutive with each other.

12. The method of claim 11, wherein the first TCI state and the second TCI state are associated with a same RSSI measurement timing configuration and different subframe offsets, wherein the different subframe offsets are configured such that the set of RSSI measurement symbols for the first TCI state is non-overlapped with a set of measurement symbols for the second TCI state.

13. The method of claim 1, further comprising:
identifying quasi-co-location (QCL) information based at least in part on a reference signal associated with the TCI state configuration.

14. The method of claim 13, further comprising:
determining the receive beam based at least in part on the QCL information.

15. A method of wireless communication performed by a base station, comprising:
transmitting, to a user equipment (UE), configuration information for a received signal strength indication (RSSI) measurement, the configuration information indicating a transmission configuration indication (TCI) state configuration for the RS SI measurement, wherein the TCI state configuration corresponds to a receive beam of the UE, and wherein the configuration information further indicates a measurement duration for an averaged value of the RSSI measurement, wherein the measurement duration is indicated as at least 84 measurement symbols; and
receiving a measurement report of the RSSI measurement, the TCI state configuration.

16. The method of claim 15, wherein the measurement report includes the averaged value of the RSSI measurement over the measurement duration based at least in part on the RS SI measurement being associated with a same TCI state for the measurement duration.

17. The method of claim 15, wherein the measurement report includes the averaged value of the RSSI measurement based at least in part on multiple RSSI measurements associated with a same receive beam of the UE, and wherein the measurement report indicates an RSSI beam group associated with the averaged value.

18. The method of claim 15, wherein the measurement report includes the averaged value of the RSSI measurement based at least in part on multiple RSSI measurements that are associated with a same receive beam of the UE and are within a threshold value of each other, and wherein the measurement report indicates an RSSI beam group associated with the averaged value.

19. The method of claim 15, wherein the measurement report indicates a discrete measurement value.

20. The method of claim 15, wherein the configuration information indicates, for each TCI state or TCI state group, at least one of:
a measurement reporting threshold,
an RSSI measurement timing configuration, or
a channel occupancy indicator.

21. The method of claim 20, wherein, for two or more TCI states or TCI state groups, the RS SI measurement timing configuration is associated with at least one of:
a same center frequency,
a same reference subcarrier spacing, or
a same cyclic prefix type.

22. The method of claim 15, wherein the configuration information indicates a reference subcarrier spacing of the RSSI measurement of at least 120 kilohertz.

23. The method of claim 15, wherein the configuration information indicates a first TCI state and a second TCI state for the RSSI measurement, wherein a set of RSSI measurement symbols for the first TCI state are consecutive with each other, and wherein a set of RSSI measurement symbols for the second TCI state are consecutive with each other.

24. The method of claim 23, wherein the first TCI state and the second TCI state are associated with different RSSI measurement timing configurations.

25. The method of claim 15, wherein the configuration information indicates a first TCI state and a second TCI state for the RSSI measurement, wherein a set of RSSI measurement symbols for the first TCI state are non-consecutive with each other.

26. The method of claim 25, wherein the first TCI state and the second TCI state are associated with a same RSSI measurement timing configuration and different subframe offsets, wherein the different subframe offsets are configured such that the set of RSSI measurement symbols for the first TCI state is non-overlapped with a set of measurement symbols for the second TCI state.

27. A user equipment (UE) for wireless communication, comprising:
one or more memories; and
one or more processors coupled to the one or more memories, the one or more processors configured to:
receive configuration information for a received signal strength indication (RSSI) measurement, the configuration information indicating a transmission configuration indication (TCI) state configuration for the RSSI measurement, wherein the TCI state configuration corresponds to a receive beam of the UE, and wherein the configuration information further indicates a measurement duration for an averaged value of the RSSI measurement, wherein the measurement duration is indicated as at least 84 measurement symbols;
perform the RSSI measurement on the receive beam based at least in part on the TCI state configuration; and
transmit a measurement report of the RSSI measurement.

28. The UE of claim 27, wherein the configuration information indicates a reference subcarrier spacing of the RSSI measurement of at least 120 kilohertz.

29. The UE of claim 27, wherein the one or more processors are further configured to:
identify quasi-co-location (QCL) information based at least in part on a reference signal associated with the TCI state configuration; and
determine the receive beam based at least in part on the QCL information.

30. A base station for wireless communication, comprising:
one or more memories; and
one or more processors coupled to the one or more memories, the one or more processors configured to:
transmit, to a user equipment (UE), configuration information for a received signal strength indication (RSSI) measurement, the configuration information indicating a transmission configuration indication (TCI) state configuration for the RSSI measurement, wherein the TCI state configuration corresponds to a receive beam of the UE, and wherein the configuration information further indicates a measurement duration for an averaged value of the RSSI measurement, wherein the measurement duration is indicated as at least 84 measurement symbols; and
receive a measurement report of the RSSI measurement, the TCI state configuration.

* * * * *